United States Patent

[15] 3,645,151

Yoshikawa

[45] Feb. 29, 1972

[54] HANDLEBAR GRIP FOR A TWO-WHEELED VEHICLE

[72] Inventor: Kunihiko Yoshikawa, Soka, Japan

[73] Assignee: Kabashiki Kaisha Yoshikawa Seisakusho, Tokyo, Japan

[22] Filed: Nov. 9, 1970

[21] Appl. No.: 87,911

[30] Foreign Application Priority Data

Aug. 8, 1970 Japan...................................45/78519

[52] U.S. Cl..................................74/551.9, 74/489, 74/491
[51] Int. Cl........................................................B62k 21/26
[58] Field of Search..................74/551.9, 551.8, 558.5, 491, 74/501, 488, 489

[56] References Cited

FOREIGN PATENTS OR APPLICATIONS 1,028,059   5/1953   France...................................74/551.9
1,039,864   9/1958   Germany..............................74/551.9

Primary Examiner—William F. O'Dea
Assistant Examiner—F. D. Shoemaker
Attorney—Waters, Roditi, Schwartz & Nissen

[57] ABSTRACT

A handlebar grip comprises a cylindrical grip member adapted for being mounted on a vehicle handlebar and an attaching member integrally formed with the grip member of a plastic material. The attaching member has a groove in which a metal reinforcing member of channel shape is secured which receives the base of a pivotal operating lever. A pivot pin extends through the attaching member, reinforcing member and the base of the operating lever while a clamping band extends around the grip member and is attached thereto by a tightening fastener passing through the attaching member and the reinforcing member.

11 Claims, 7 Drawing Figures

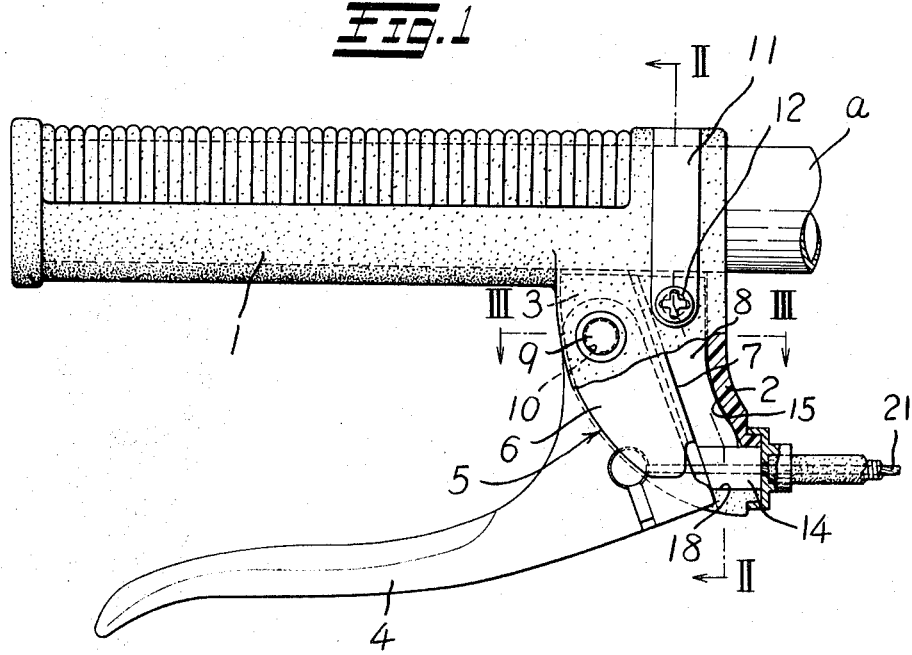
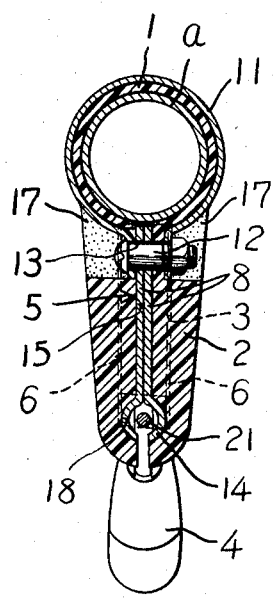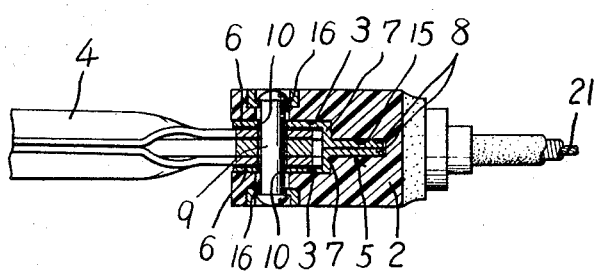

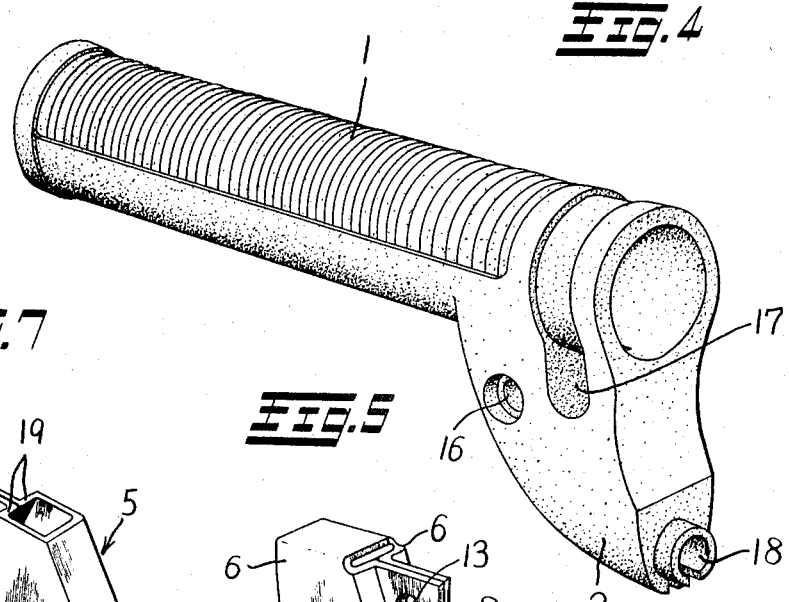
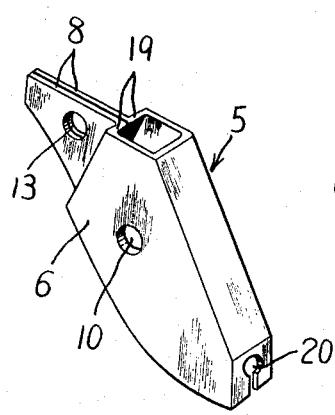
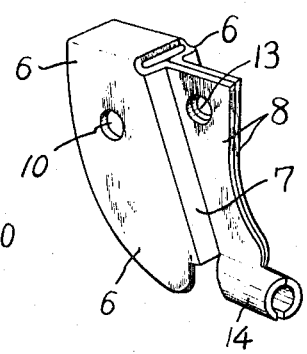
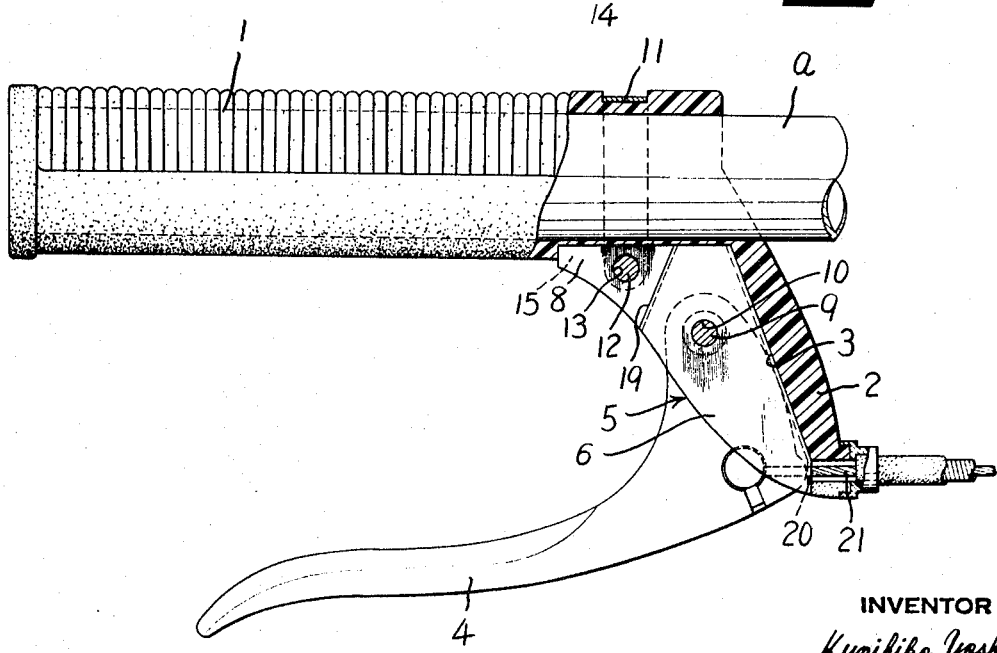

HANDLEBAR GRIP FOR A TWO-WHEELED VEHICLE

BRIEF SUMMARY OF THE INVENTION

The invention relates to a handlebar grip for a two-wheeled vehicle wherein a cylindrical grip which is to be mounted on a vehicle handlebar and an attaching member to which an operating lever such as a brake lever, an acceleration lever, or the like, is to be attached, are made of plastic material such as rubber, synthetic resin or the like, so as to be integral one with another.

It has been usual in handlebar grips of this kind to provide reinforcement of the attaching member for the operating lever by embedding a metallic reinforcing plate in the attaching member. Such an embedding of a reinforcing plate requires skill and raises the price because the attaching member is small in thickness.

An object of this invention is to provide a handlebar grip construction in which the above deficiency is removed, and the construction is characterized in that a cylindrical grip mounted on a vehicle handlebar and an attaching member projecting laterally therefrom and having a groove for receiving the base of an operating lever are made of plastic material so as to be integral with another, a channel-shaped metallic reinforcing member being firmly mounted in the groove, while a pivot for the operating lever and a tightening bolt for a clamping band for the grip are passed through the attaching member and the reinforcing member.

According to a feature of this invention, a slit extends from the bottom surface of the groove of the attaching member, and a flange projecting from the rear surface of the bottom wall of the reinforcing member is mounted in the slit, the tightening bolt for the clamping band passing through the flange.

According to another feature of this invention, the upper portion of the channel-shaped metallic reinforcing member is formed into a rectangular frame by interconnecting opposite sidewalls thereof through a connecting member, and a flange projecting from the outer surface of the connecting member is mounted in a slit extending from the groove, the tightening bolt for the clamping band passing through the flange.

BRIEF DESCRIPTION OF THE DRAWING

FIG. 1 is a side view, partly in section, of one embodiment according to this invention;

FIG. 2 is a sectional view taken along line II—II in FIG. 1;

FIG. 3 is a sectional view taken along line III—III in FIG. 1;

FIG. 4 is a perspective view of only the main body of the grip;

FIG. 5 is a perspective view of a channel-shaped metallic reinforcing member;

FIG. 6 is a side view, partly in section, of another embodiment according to this invention; and FIG. 7 is a perspective view of the channel-shaped metallic reinforcing member used therein.

DETAILED DESCRIPTION

Referring to the drawing, numeral 1 denotes a cylindrical grip which is mounted on a vehicle handlebar $a$, and is integral with an attaching member 2 having a groove 3 for receiving the base of an operating lever 4 such as a brake lever, an acceleration lever or the like, so that the operating lever extends therefrom. Members 1 and 2 are made of a plastic material such as rubber or synthetic resin, for example, by injection molding so as to be integrally formed. Numeral 5 denotes a channel-shaped metallic reinforcing member which is firmly mounted in the groove 3, and the reinforcing member is made of a metallic plate formed into a channel shape with opposite sidewalls 6, and a bottom wall 7 as shown in FIG. 5, a flange 8 being formed by bringing sides 6 into face-to-face contact and projecting from the rear surface of the bottom wall 7 perpendicularly thereto. An opening 10 is formed in each sidewall 6 for receiving a pivot 9 for the operating lever 4 and an opening 13 is formed in flange 8 for receiving a tightening bolt 12 for tightening a clamping band 11 for the grip 1. A tubular portion 14 is formed at the lower end of flange 8 for receiving an operating wire 21 such as a brake wire or the like. The groove 3 formed in the attaching member 2 for receiving the reinforcing member 5 is provided at the bottom surface thereof with a slit 15 extending therefrom for receiving the flange 8 of the reinforcing member 5, and the sidewalls thereof are provided, at positions corresponding to the openings 10, 13, with openings 16, 17, respectively, while additionally an opening 18 is provided at the lower portion of the groove 3 for receiving the tubular portion 14.

The grip is assembled by inserting the base of the operating lever in the reinforcing member 5 firmly mounted in the groove 3, and is attached thereto by the pivot 9, whereafter the grip is mounted on the handlebar $a$ and the clamping band 11 is applied to the outer surface of the grip 1 and the opposite ends of the band 11 are tightened together by the tightening bolt 12 within the openings 13, 17.

In the illustrated embodiment shown in FIGS. 6 and 7, the upper portion of the reinforcing member 5 is formed as a rectangular frame in such a manner that the opposite sidewalls 6 thereof are interconnected through a connecting portion 19, and the flange 8 projects from the outer surface of the connecting member 19 perpendicularly thereto, and is inserted in the slit 15 extending from the groove 3, the opening 13 for receiving the tightening bolt 12 for the clamping band 11 being made in the flange 8, while the opening 20 for receiving the operating wire 21 is provided at the lower portion of the reinforcing member 5.

Thus, according to the invention the cylindrical grip and the attaching member for attaching the operating lever are made of plastic material so as to be integral one with another, and the channel-shaped metallic reinforcing member is mounted firmly in the groove made in the attaching member while additionally, the flange projecting forwards or rearwards from the reinforcing member is mounted in the slit extending from the groove, so that the reinforcing member can be easily attached to the attaching member and act effectively for reinforcing the attaching member, the manufacture thereof being simple in comparison with the conventional method wherein a reinforcing plate is embedded in the attaching member in the injection molding operation. The attaching member and the reinforcing member are firmly held together by means of the attachment of the pivot for the operating lever and the tightening bolt of the clamping band.

What is claimed is:

1. A handlebar grip for a two-wheeled vehicle comprising a cylindrical grip member adapted for being mounted on a vehicle handlebar, and an attaching member projecting laterally from said grip member and having a groove, said grip member and attaching member being molded from plastic material so as to be integral with one another, a channel-shaped metallic reinforcing member mounted firmly in said groove, an operating lever including a base portion inserted into said channel-shaped reinforcing member and an engagement portion extending beyond said attaching member, a pivot means for the operating lever, and attachment means for a clamping band for the grip, said pivot means and attachment means passing through the attaching member and the reinforcing member, respectively.

2. A handlebar grip as claimed in claim 1, wherein said channel-shaped reinforcing member includes spaced, opposite sidewalls, said base portion of the operating lever being inserted between said walls.

3. A handlebar grip as claimed in claim 2, wherein said walls have aligned openings, said pivot means comprising a pivot extending through said aligned openings.

4. A handlebar grip as claimed in claim 3, wherein said attaching member has a narrow slit extending from said groove, said attaching member comprising a flange extending into said slit, said attaching member and flange having aligned openings, said attachment means extending through the latter aligned openings.

5. A handlebar grip as claimed in claim 4, wherein said reinforcing member includes a tubular portion on and extending from said flange for passage of an operating member to be connected to said operating lever.

6. A handlebar grip as claimed in claim 5, wherein said groove opens externally of said attaching member at the rear thereof and said slit is confined in said attaching member and extends forward in the attaching member from the base of said groove.

7. A handlebar grip as claimed in claim 6, wherein said flange of the reinforcing member is constituted by said walls pressed into face-to-face contact.

8. A handlebar grip as claimed in claim 4, wherein said groove opens externally of said attaching member at the rear thereof and said slit is confined in said attaching member and extends upwardly and rearwardly in the attaching member.

9. A handlebar grip as claimed in claim 8 wherein said flange of the reinforcing member is constituted by said walls pressed into face-to-face contact at the upper portion of the reinforcing member.

10. A handlebar grip as claimed in claim 9, wherein said reinforcing member has end walls connecting the sidewalls, to form a hollow body from which said flange extends.

11. A handlebar grip as claimed in claim 4, wherein said grip member and attaching member cooperatively define a slot for receiving the clamping band.

* * * * *